UNITED STATES PATENT OFFICE.

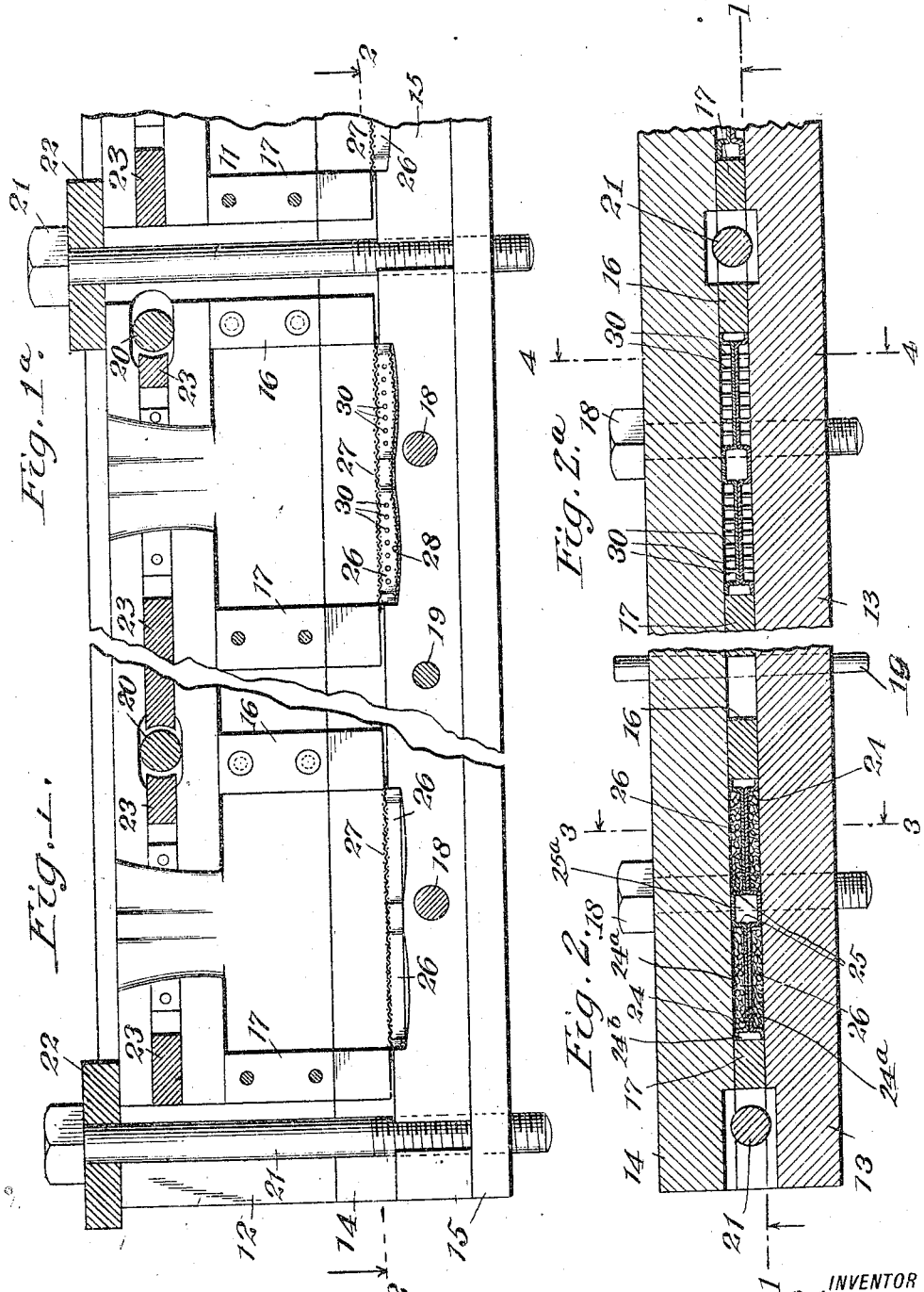

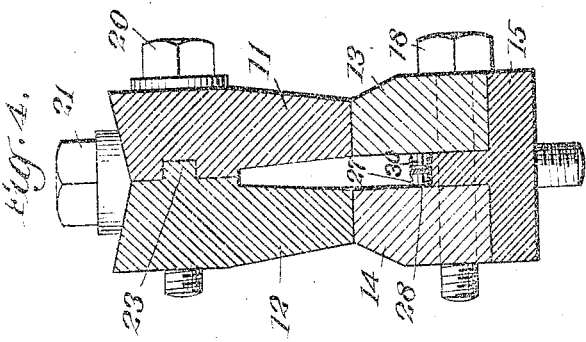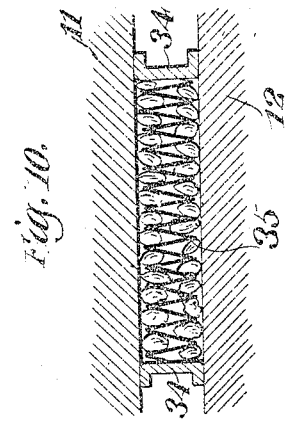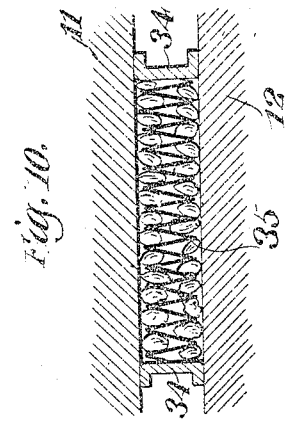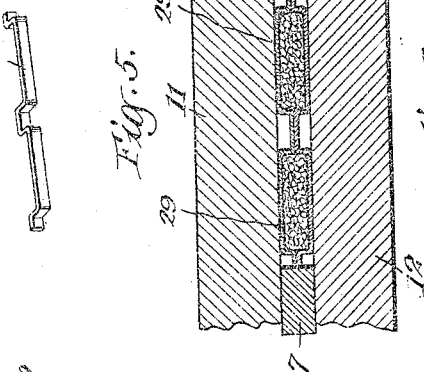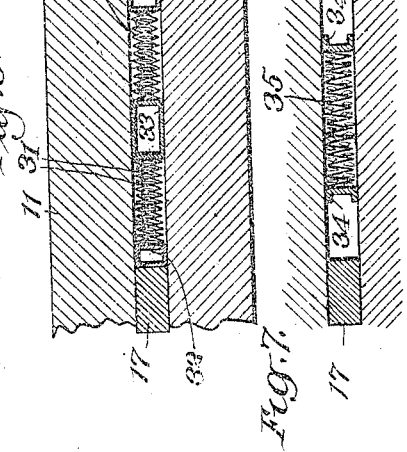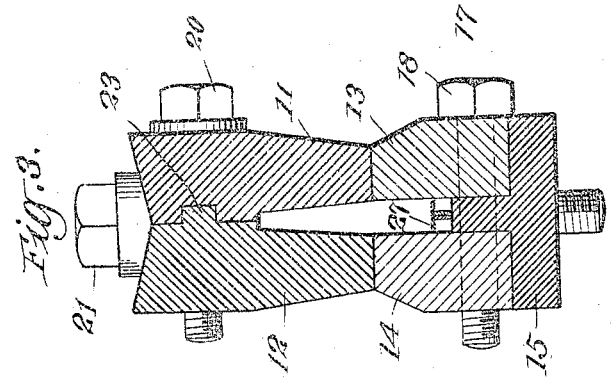

WILLARD F. MEYERS, OF JAMAICA, NEW YORK.

MOLD FOR TEETH FOR STONE-SAWS.

1,052,841.

Specification of Letters Patent.  Patented Feb. 11, 1913.

Application filed September 15, 1911. Serial No. 649,442.

*To all whom it may concern:*

Be it known that I, WILLARD F. MEYERS, a citizen of the United States, residing at Jamaica, borough of Queens, city of New York, in the county of Queens and State of New York, have invented certain new and useful Improvements in Molds for Teeth for Stone-Saws, of which the following is a specification, reference being had therein to the accompanying drawings, forming part thereof.

My invention relates to molds for molding teeth for stone saws of the type employing abrasive material, such as black or Brazilian diamonds. As is well known, such teeth are formed by molding them with abrasive material in their cutting edges.

One of the objects of my invention is to provide an improved mold suitable for molding teeth with very small pieces of abrasive material in their cutting edges, such as diamonds or broken pieces of diamonds or diamond chips, carborundum, corundum, sapphires, or other suitable abrasive material, thereby producing teeth having a relatively large number of closely arranged cutting points. A tooth so molded will make a rapid and smooth cut and will not chip the corners of the stones, as is frequently the case with teeth containing a few large diamonds, and will produce a fine, well defined edge or corner.

I shall hereinafter speak of abrasives generally as diamonds, it being understood that the term is intended to include any suitable abrasive.

Another object is to provide a mold which can be easily taken apart after the metal has cooled.

Other objects are simplicity, economy and durability of construction and reliability of operation.

Still other objects and advantages of my invention will appear from the following description.

My invention comprehends a means for confining the abrasive material to a portion of the mold cavity, so that it will not be floated by the molten metal out of desired position, such means comprising a foraminous partition secured in and extending across the mold, and more specifically the use of a wire screen held in the mold cavity for such purpose.

My invention also comprehends a removable retaining frame resting on the bottom of the mold cavity and shaped to provide one or more transverse partitions adapted to confine the abrasive material to one or more portions of the bottom of the cavity.

My invention further comprehends longitudinally extending connecting means for the partitions, either with or without transversely extending portions arranged to hold and space the abrasive material.

My invention further comprehends the combination with such a retaining frame of a foraminous member, such as a wire screen, laid over the frame to hold the abrasive material in place as the molten metal is poured in and prevent the abrasive material from floating out of the frame.

My invention further comprehends a foraminous member, such as a wire screen, laid on the bottom of the mold cavity underneath the retaining frame to slightly elevate the abrasive particles and permit the metal to better flow around them and thus procure a better setting.

My invention also includes side pieces to the mold having their upper faces inwardly inclined or beveled to facilitate the taking apart of the mold after the metal has cooled and shrunk.

My invention also includes various other features of construction and combinations of parts as will hereinafter more fully appear.

I shall now describe the embodiment of my invention illustrated in the accompanying drawings and shall thereafter point out my invention in claims.

Figure 1 is a vertical sectional elevation of a portion of a mold taken on the line 1—1 of Figs. 2 and 2ª, looking rearward, showing the T-shaped bottom piece in elevation. Fig. 1ª is a similar view of another portion of the mold showing a modified form of my invention. Fig. 2 is a horizontal section of the part shown in Fig. 1 taken on line 2—2 of Figs. 1 and 1ª, looking down, the wire screen being omitted for the sake of clearness. Fig. 2ª is a similar view of the parts shown in Fig. 1ª. Fig. 3 is a transverse section of the part shown in Fig. 2 taken on line 3—3 of Fig. 2, looking toward the left. Fig. 4 is a similar view of the part shown in Fig. 2ª taken on the line 4—4 of Fig. 2ª. Figs. 5, 6 and 7 are views corresponding to Fig. 2 showing a portion containing one mold cavity and showing different modifications of my invention Figs. 8 and 9 are detail perspective views of different forms of retaining frames. Fig. 10 is an enlarged view of the middle portion of the mold cavity shown in Fig. 7.

This invention is an improvement upon my invention disclosed in my prior United States Letters Patent, Number 932,488, issued to me August 31, 1909, for mold for teeth for diamond saws; and the illustrated embodiments of my invention are adapted to the mold disclosed in my said prior patent. This mold is constructed in five main pieces, two upper side pieces or sections 11 and 12, and two lower side pieces 13 and 14, and a T-shaped base piece 15. The upper side pieces 11 and 12 are rabbeted to form the upper part of the mold cavity and the lower pieces 13 and 14 are spaced apart a distance equal to the width of the combined rabbets of the upper pieces alongside of the tongue of the T-shaped base piece, which extends upward between the lower side pieces and forms the bottom of the mold. To limit the length of each mold cavity, I provide in the rabbets partition pieces 16 riveted on the upper side piece 11 and similar partition pieces 17 on the side piece 12, and these partitions extend down to the top of the T-shaped base piece 15 and fit tightly in the cavity formed by the rabbets to form the ends of the mold.

The lower side pieces 13 and 14 are secured to the tongue of the base 15 by the clamping bolts 18, which pass through holes in the lower side piece 13 and in the tongue and screw into the lower side piece 14. Draft pins 19 may be employed to bring the holes in proper alinement. The upper side pieces 11 and 12 are clamped together by bolts 20, which pass through apertures in the upper side piece 11 and screw into the upper side piece 12. To permit relative longitudinal adjustment of these upper side pieces in order to vary the width of the mold cavities, the apertures in the upper side piece 11 are elongated as shown. The upper parts of the mold are clamped to the lower parts of the mold by the usual vertical clamping bolts 21, which pass through similarly elongated slots between the upper side pieces 11 and 12 and screw into the base 15. Washers 22 close the upper ends of the slots for the bolts 21 and serve as the upper clamping means and the base 15 serves as the lower clamping means, thus providing a strong and convenient means for clamping the parts together vertically and leaving the base piece 15 integral, because of the fact that, while the holes for the clamp bolts 21 cut through the tongue or stem of the T-shaped base piece 15, the lower part of this base piece is of sufficient width to receive and bridge across the bolts 21 which serve as clamping means. A tongue 23 on the upper side piece 12, fitting in a longitudinal groove in the upper side piece 11, keeps the parts in correct vertical alinement during their adjustment, and the partitions 16 and 17, extending down between the lower side pieces 13 and 14, also serve as guides to keep the upper side pieces in accurate lateral alinement with the lower side pieces.

In the embodiment of my invention illustrated in the drawings, I employ a very thin sheet metal frame composed of one or more parts and shaped to confine small or fragmentary diamonds to the desired portions of the bottom of the mold cavity corresponding to those portions of the cutting edge of the tooth in which the diamonds are to be set.

The illustrated mold is adapted to mold teeth for circular saws and hence the edges of the teeth are molded to an arcuate shape; and the mold is adapted to simultaneously mold in each mold cavity two teeth in end to end relation, the teeth being cut apart transversely after being taken out of the mold; and, therefore, each half of the bottom of each mold cavity is of the arcuate shape of the edge of a tooth, or, in other words, the bottom of each mold cavity forms longitudinally two similar arcs meeting at the middle of the bottom.

The end edges of the cutting faces of these teeth are usually milled off or provided with V-grooves to accommodate rivets which pass through the same blade in front of the beveled edges of the teeth and lock the teeth in the blade, and to keep these edges free of diamonds in order that they may readily be milled off, the retaining frame is so shaped as to exclude diamonds from those portions of the teeth. The embodiments of my invention illustrated in Figs. 1 to 6, inclusive, comprise frames shaped to form four transverse partitions and portions coöperating with the side and end walls of the mold cavity to hold the partitions in place.

As shown in Figs. 1 and 1ª, the tongue of the T-piece 15 has shallow cut-out portions in its top edge to form the bottom of the mold cavities, and the retaining frames are substantially of a height equal to the depth of these cut-out portions, so that, when the frames are in place, their tops are substantially in the plane of the top edge of the T-piece.

In the embodiment of my invention illustrated in Figs. 1 and 2, the frame consists of two similar flat and very thin sheet metal members placed together on edge in the bottom of the mold, and having outwardly bent portions at their middle portions and end portions which coöperate to form two end partitions 24 and two middle partitions 25, each middle partition being joined to its adjacent end partition by a central longitudinal rib 26 composed of the two thicknesses of the sheet metal. The length of the frame is the same as that of the mold cavity and the partitions are of the width of the mold cavity, so that the frame fits snugly in the bottom of the cavity. The members are bent so as to form the end partitions a distance from the end of the mold equal to the distance that the edge of the tooth is grooved, and the middle partitions are separated double that distance, so that, when the teeth are cut apart at the middle, each tooth will have its end partition the proper distance from its edge. Thus the frame serves to partition off a portion at the center and each end of the bottom of the mold cavity.

The small diamonds are placed loose over the bottom of the mold cavity as shown in Fig. 2 on the two portions 24ª between each middle partition 25 and its respective end partition 24, and are excluded from the spaces 25ª between the two middle partitions and from the spaces 24ᵇ outside the two end partitions. To prevent the diamonds from floating out of place when the molten metal is poured into the mold, a wire screen 27 is laid over the frame with its ends clamped underneath the partition pieces 16 and 17, there being sufficient clearance between the ends of the partition pieces and the top of the T-piece to receive the ends of the screen while tightly clamping the screen. The mesh of the screen is sufficiently fine to prevent the diamonds from passing through. As shown in Figs. 1ª and 4, another screen 28 may be placed on the bottom of the mold cavity underneath the frame, the function of which is to raise the diamonds slightly off the bottom and permit the metal to better flow around them and thus obtain a better setting for the diamonds. The screens and the frames partially fuse and partially become welded into the edge of the teeth as the metal hardens. It is manifest that the casting, instead of being cut apart at the middle to form two teeth as above described, may be used as one tooth, in which case the middle portion between the two middle partitions may be milled out to form a water space.

In the modification shown in Figs. 5 and 8, the frame is composed of two similar halves 29, bent to a shape just the reverse of those shown in Figs. 1 and 2, and it is manifest that the frame could be variously formed and that the two halves could be joined together if desired. It will be understood that the diamonds which may be thrown loose into the above described retaining frames are preferably of polyhedronal shape with many cutting points so that they may be cast in any one of various positions; but that small flat pieces of diamonds must be set on end with their cutting point down and held in that position during the molding operation. In the construction shown in Figs. 1ª and 2ª, I provide means for so holding the flat diamonds, consisting of a plurality of transversely extending pins 30 inserted through the ribs 26, the diamonds being set on end between adjacent pins.

In Figs. 6, 7 and 10 I have shown means for positively gripping and holding such flat diamonds, consisting of one or more coiled compression spring members, the springs being so wound as to leave room between the successive coils for the insertion of a diamond which is firmly grasped and held by the compressive tendency of the spring. In the construction shown in Fig. 6, two such spring members 31 coöperate to accommodate one central row of diamonds set within the successive adjacent complementary loops, as shown, and if desired, there may be two outer rows, one set outside of each spring member. The end partitions comprise rectangular frames 32 and the central partition is formed by a somewhat larger rectangular member 33 (shown in detail in Fig. 9), set in the center of the bottom of the mold cavity.

In the construction shown in Figs. 7 and 10, a single larger spring member 35 is employed having a diameter substantially the width of the mold cavity. The end partitions comprise two rectangular U-shaped members 34 held in place by their friction against the side walls, the whole frame being shorter than the mold cavity and, since it is designed for the molding of a single tooth, it is placed in the center of the bottom, leaving a substantial portion of the end of the tooth free of diamonds. In this construction as shown in Fig. 10, two rows of diamonds are set, leaving the center substantially unoccupied, and in a saw blade in which such teeth are used, there are occasionally placed teeth cast in the construction of mold shown in Fig. 6, so that the middle row of diamonds in the latter teeth will saw out any portion of the cut not operated upon by the middle of the former teeth.

In practice, in filling the mold with the molten metal, in order to be assured that the mold cavity is full, the operator usually pours in an excess of metal which fills the gate and flows out over the top of the mold. As this metal hardens, it shrinks, and the portion on the top of the mold coöperates with that in the mold cavity to clamp the mold tightly together so that it is extremely difficult to get the mold apart when metal is thus poured over the top of the mold. To facilitate the taking apart of the mold under such circumstances, the upper side pieces 11 and 12 are provided their full length with beveled upper faces sloping inwardly from their outer edges to their inner edges, the beveled faces together forming an open ended V-shaped top for the mold. It will be manifest that side pieces having tops of such shape will readily slip from under the metal on top of the mold, and that the disadvantages of the clamping action of the metal will by this simple means be entirely obviated.

In assembling the mold, the lower side pieces 13 and 14 are first bolted to the T-piece 15, then the retaining frame is set down into the cut-out portions of the top of the T-piece, either with or without a wire screen 28 first having been laid on the bottom of the cavity, the diamonds are then either scattered loose over the portions of the bottom of the cavity between the end partitions and their adjacent middle partitions, or, if flat diamonds, are set into the successive places provided for them. The screen 27 is then laid on and the rest of the mold secured together with the ends of the screen 27 clamped between the top of the T-piece 15 and the bottom of the partition pieces 16 and 17. The mold is then ready for casting the teeth by pouring in molten steel in the usual manner.

It is obvious that various modifications may be produced in the constructions shown and above particularly described within the principle and scope of my invention.

I claim:—

1. In a mold for saw teeth, means for confining loose abrasive material to a portion of the mold cavity comprising a foraminous partition secured in the mold and extending across the mold.

2. In a mold for saw teeth, means for confining loose abrasive material to a portion of the mold cavity comprising a wire screen held in the mold cavity.

3. In a mold for saw teeth, a removable retaining frame fitting in the mold cavity and retained in position by the side walls thereof and disposed on the bottom of the mold cavity and shaped to confine loose abrasive material to a portion of the bottom of the mold cavity.

4. In a mold for saw teeth, means for confining loose abrasive material to a portion of the bottom of the mold cavity, comprising a retaining frame arranged to lie on the bottom of the mold cavity and to partition off a portion of each end thereof.

5. In a mold for saw teeth, means for confining loose abrasive material to a portion of the bottom of the mold cavity, comprising two transverse partitions disposed on the bottom of the mold cavity, and means extending longitudinally of the cavity connecting the two partitions.

6. In a mold for saw teeth, means for confining loose abrasive material to defined portions of the bottom of the mold cavity, comprising a series of transverse partitions suitably disposed on the bottom of the mold cavity, and means extending longitudinally of the mold cavity for relatively spacing the successive partitions.

7. In a mold for saw teeth, means for confining loose abrasive material to a portion of the bottom of the mold cavity, comprising two transverse partitions disposed on the bottom of the mold cavity, and means for spacing the two partitions comprising a longitudinally extending member connecting the two partitions and including transversely extending portions arranged to space the abrasive material.

8. In a mold for saw teeth, a removable retaining frame disposed on the bottom of the mold cavity and shaped to confine loose abrasive material to a portion of the bottom of the mold cavity, and a foraminous member covering the retaining frame.

9. In a mold for saw teeth, a removable retaining frame disposed on the bottom of the mold cavity and shaped to confine loose abrasive material to a portion of the bottom of the mold cavity, a foraminous member disposed on the bottom of the mold cavity, and a second foraminous member covering the retaining frame.

10. In a mold for saw teeth, means for confining abrasive material to a portion of the bottom of the mold cavity, comprising two transverse partitions disposed on the bottom of the mold cavity, means extending longitudinally of the cavity connecting the two partitions, and a foraminous member covering the partitions and the connecting means.

11. In a mold for saw teeth, means for confining abrasive material to a portion of the bottom of the mold cavity, comprising two transverse partitions disposed on the bottom of the mold cavity, means for spacing the two partitions comprising a longitudinally extending member connecting the two partitions and including transversely extending portions arranged to space the abrasive material, and a foraminous member covering the partitions and spacing means.

12. In a mold for saw teeth, in combination with end partitions for the mold cavity, means for confining abrasive material to the bottom of the mold cavity comprising a foraminous partition extending over the bottom of the mold cavity and clamped in position by the end partitions.

13. In a mold for saw teeth, in combination with bottom and side pieces and end partitions for the mold cavity, the bottom piece being provided with a shallow cut-out portion to form the bottom of the mold cavity, means for confining abrasive material to the bottom of the mold cavity comprising a foraminous partition disposed across the cut-out portion and having its ends clamped under the end partitions.

14. In a mold for saw teeth, a removable retaining frame comprising a coiled spring member laid longitudinally in the bottom of the mold.

15. In a mold for saw teeth, a removable retaining frame comprising a coiled spring member laid longitudinally in the bottom of the mold, and removable substantially rectangular end partitions.

16. In a mold for saw teeth, a removable retaining frame comprising a coiled spring member laid longitudinally in the bottom of the mold, and a foraminous member covering the spring member.

In testimony whereof I have affixed my signature in presence of two witnesses.

WILLARD F. MEYERS.

Witnesses:
 VICTOR D. BORST,
 BERNARD COWEN.